Jan. 27, 1959
H. PESELNICK
2,870,831
MULTIPANEL WINDOWS
Filed June 15, 1955
2 Sheets-Sheet 1
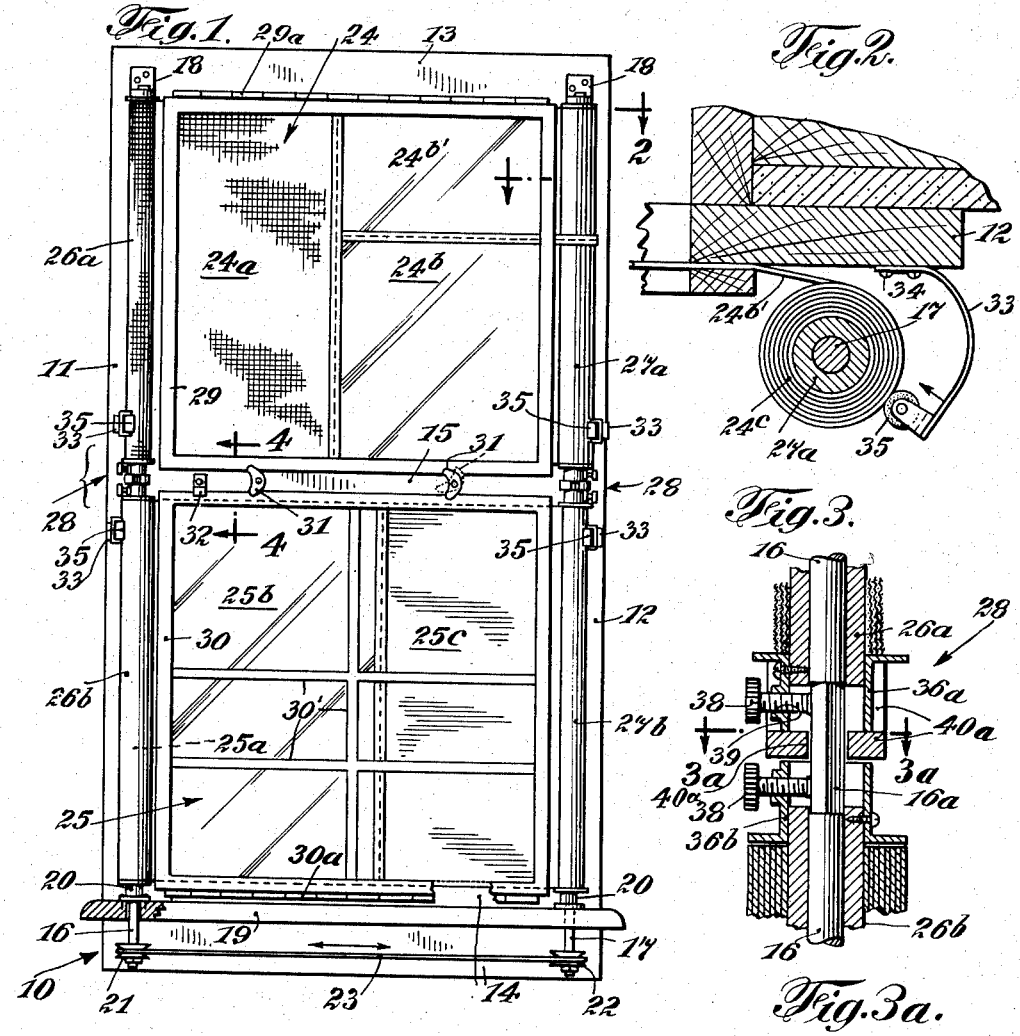
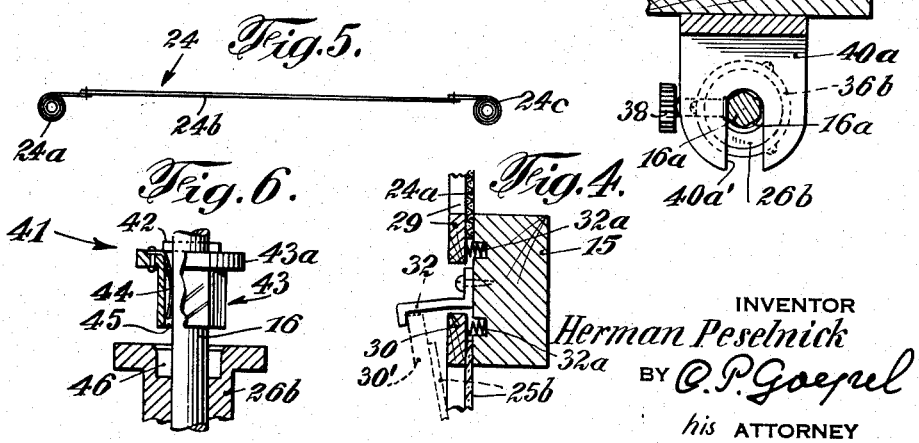
INVENTOR
Herman Peselnick
BY O.P.Goepel
his ATTORNEY

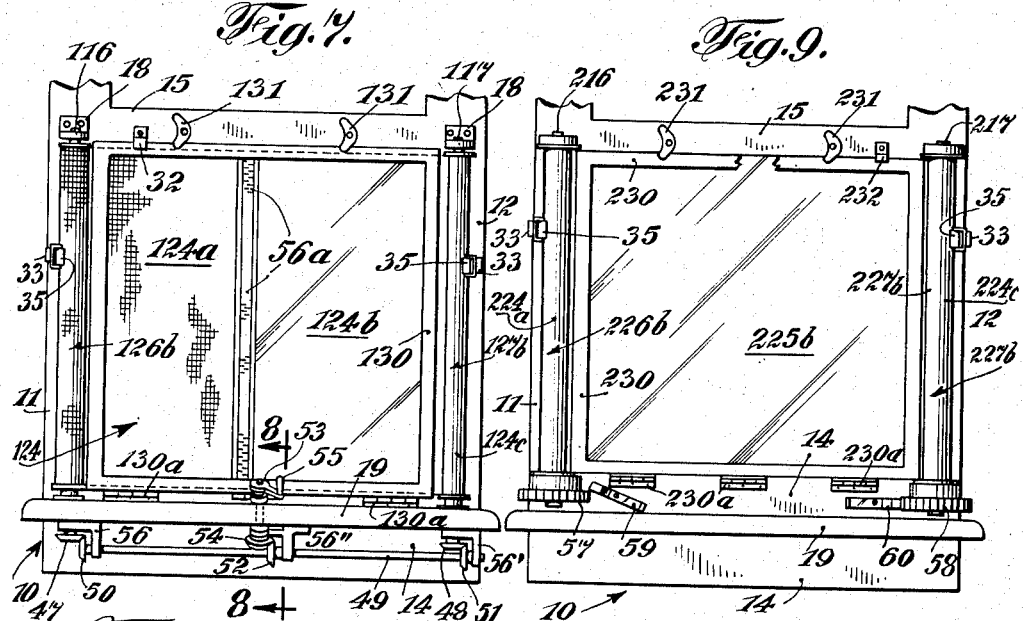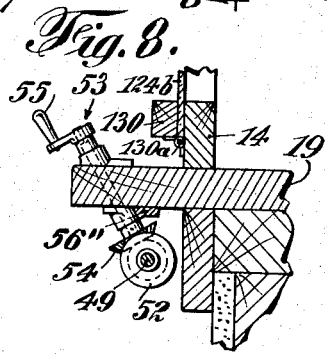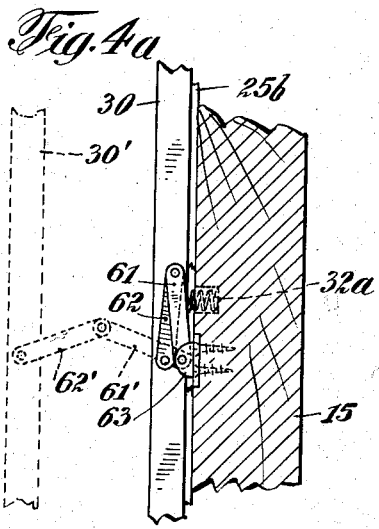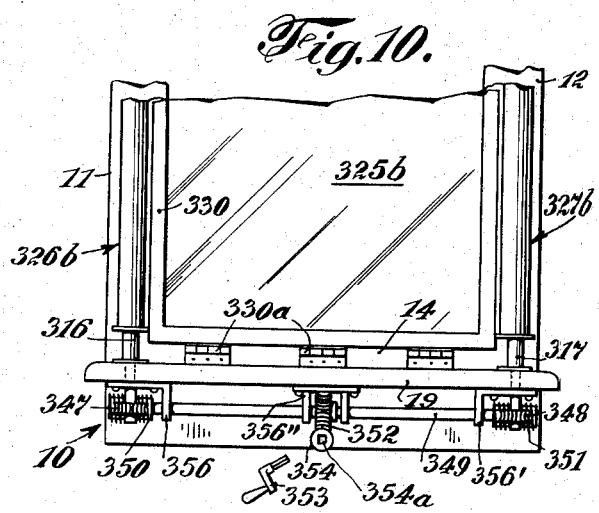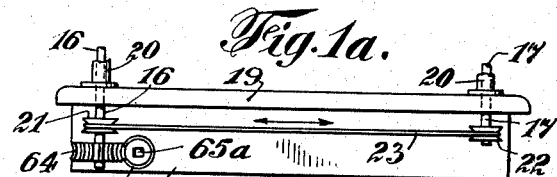

2,870,831

MULTIPANEL WINDOWS

Herman Peselnick, Brooklyn, N. Y.

Application June 15, 1955, Serial No. 515,628

5 Claims. (Cl. 160—120)

This invention relates to improvements in windows, and more particularly to a combined screen, storm and blackout window.

The window constructed in accordance with this invention may be permanently installed and is practical in all climates throughout the year. It consists essentially of a flexible composite band having a transparent section of suitable plastic material, a screen portion, and a portion of semi- or non-transparent material, such as black cloth or the like, suitably mounted on rollers supported at the lateral sides of a window frame, and means to wind said composite band from one side of the window frame to the other and vice versa. A retaining member or frame is provided for tightly holding the visible band portion against the window frame to prevent noise or draft.

While it has already been proposed to combine a transparent material with a screen and to mount the same on rollers, such structures were not generally accepted by the house owners for various reasons, such as relative complicatedness of the devices proposed with consequent high costs for installation thereof, noise connected with their use, and the fact that such devices are not sealing when elimination of draft is desired, as in the winter season.

Several embodiments of the invention, all based on a common inventive concept, will be described hereinafter and are illustrated in the accompanying drawing, but it will be appreciated that the invention is susceptible of a number of modifications such as may occur to persons skilled in the art, and it is therefore not desired that the same be limited to the exact details shown and described, but only by the scope of the appended claims.

In the accompanying drawing, wherein like characters of reference indicate similar elements.

Fig. 1 is a front elevational view of the preferred embodiment of the novel combination window, showing a pair of bands between vertical rollers movable independently or conjointly by a pulley arrangement below the window sill, and a pair of retaining frames that prevent noise or draft;

Fig. 1a is a view of the bottom portion of the window illustrated in Fig. 1, with an additional drive for the two vertical roller supporting shafts;

Fig. 2 is a horizontal section through one of the upper rollers, taken on line 2—2 in Fig. 1;

Fig. 3 is an enlarged section through the gripper mechanism for connecting the rollers to a common shaft;

Fig. 3a is a section taken on line 3a—3a in Fig. 3;

Fig. 4 is an enlarged vertical section taken on line 4—4 in Fig. 1;

Fig. 4a is a view, substantially at right angles to that of Fig. 4, showing a different structure for limiting the pivotal movement of the lower retaining frame;

Fig. 5 is a diagrammatic illustration of one detached band, showing the relative disposition of its sections;

Fig. 6 is an enlarged sectional illustration of another shaft gripper mechanism;

Fig. 7 is a view of the lower half of a window, showing a modified embodiment of the invention with a different roller drive;

Fig. 8 is a section on line 8—8 in Fig. 7;

Fig. 9 is a view similar to that of Fig. 7, with a different roller drive; and

Fig. 10 shows the window of Fig. 9 with a still different drive.

Referring now in more detail to the illustrated embodiments, and more particularly to Figs. 1 to 6, a window frame generally indicated by numeral 10, has side members 11, 12, upper and lower members 13, 14, and a reinforcing cross member 15, conveniently made of wood or suitable light metal. A pair of vertical shafts 16, 17 are mounted on side members 11, 12 by brackets 18 at their upper extremities, and pass through suitable flanged stops 20 and sill 19 on which said stops 20 are non-rotatably supported. The lower extremities of shafts 16, 17 are provided with pulleys 21, 22, connected by belt 23 serving as a means for manually rotating shafts 16, 17 in either direction.

As seen in Fig. 1a, one of the shafts, for example shaft 16, may be extended below its pulley 21, and a worm wheel 64 mounted thereon which meshes with a worm 65 rotatably supported on the lower frame member 14. Worm 65 is provided with a square hole 65a for reception of a crank (not shown) that will rotate shafts 16, 17 in either direction.

Bands 24, 25, one of which is shown in more detail in Fig. 5, are anchored at their lateral ends in flanged rollers 26a, 27a, and 26b, 27b, respectively, with the horizontal edges of upper band 24 somewhat overlapping window frame members 13, 15, and the lower band 25 overlapping members 15, 14. A device generally indicated by numeral 28 and better shown in Figs. 3 and 3a, independently connects to or disconnects rollers 26, 27 from the shafts 16, 17 to bring a selected portion of bands 24, 25 between the rollers in accordance with the outdoor climatic conditions and at the convenience of occupants.

Each of bands 24, 25 may consist of a screen portion 24a, 25a, a transparent or translucent portion 24b, 25b, and a blackout portion 24c, 25c.

Rigid retaining frames 29, 30, hinged to upper member 13 at 29a, and to lower member 14 at 30a, respectively, bear against the visible portions of bands 24, 25 extending between their respective rollers 26a, 27a, and 26b, 27b, to tightly retain the bands against the window frame 10 and prevent dust or insects from finding their way into the room when the screens 24a, 25a are visible; or draft when the transparent portions 24b, 25b are between the rollers, while at the same time eliminating noise in case that the band portion between its respective rollers is not tightly drawn in windy weather. These retaining frames may be simultaneously or selectively released by turnbuttons 31 of suitable contour adapting them to hold one, the other, or both frames, or to release both frames at the same time. Frames 29, 30 are preferably lined along their contact surfaces with a resilient layer of felt or rubber-like material (not shown) to insure a tight seal with the window frame and the bands 24, 25 therebetween. A coil spring 32a (shown in Fig. 4) may be embedded in cross member 15 below each of the frames 29, 30 to urge said frames away from the bands 24, 25 on actuation of turnbuttons 31, and a hook 32 extending a short distance away from cross member 15 serves as a means to prevent released lower frame 30 from pivoting entirely around its hinge 30a, which could cause injury or inconvenience to the operator.

Hook 32 may be replaced by an arrangement shown in Fig. 4a. Here, a link 62 is pivotally connected to the upper end of frame 30 and to a similar link 61, the latter being pivotable in a member 63 attached to cross member 15. As shown in dotted lines, frame 30 may be pivoted away from cross member 15 a distance equaling the combined length of links 61, 62. The advantage of this arrangement resides in that no projecting parts are visible while frame 30 is detained by turnbuttons 31.

In order to prevent portions of bands 24, 25 from unrolling from their respective rollers, while said rollers are disconnected from shafts 16, 17, four leaf springs 33, held by screws 34 (see Fig. 2) to side members 11, 12 and each rotatably supporting a roller 35 of rubber or the like, cause said rollers to bear against bands 24, 25 at all times and prevent their unrolling.

A simple and efficient structure 28 serving to selectively or jointly connect and release rollers 26, 27 to or from shafts 16, 17, is shown in Figs. 3 and 3a. Referring to Fig. 3, shaft 16 has a short portion 16a of hexagonal contour which may be engaged by the flat ends of thumb screws 38. These thumb screws 38 traverse threaded bores 39 in sleeves 36a, 36b, which sleeves are integral with rollers 26a, 26b. Roller 26a rests on a platform member 40a having an open slot 40a' for reception of shaft 16 (see Fig. 3a). Leaf springs 33 cause sufficient friction between band 24 and roller 26a on the one hand, and the rubber roller 35 on the other hand to prevent said roller 26a from rotating with shaft 16 while screw 38 is loose. However, when the flat end of screw 38 is brought into intimate contact with one facet of the hexagonal portion 16a, roller 26a will rotate together with said shaft when the belt 23 is moved in either direction, and after retaining frame 29 has been released by actuation of turnbuttons 31.

An alternate embodiment, generally indicated by numeral 41, is shown in Fig. 6, to serve the same purpose as the device 28. Here, a sleeve 43 of outer hexagonal contour is keyed to shaft 16 (not shown) but is vertically reciprocatable therealong against the frictional force of a leaf spring 44 in channel 45. A stop 42 limits the upward movement of said sleeve 43. Roller 26b is provided with a bore 46 of hexagonal contour, which receives the lower hexagonal portion of sleeve 43 so that shaft 16 with sleeve 43 and roller 26b may rotate in unison. To disconnect roller 26b, flange 43a is pushed upwardly against the stop 42 to remove hexagonal portion of sleeve 43 from the bore 46 in roller 26b. Obviously, a sleeve 43 cooperating with upper rollers 26a and 27a will be mounted in inverted position to again abut against the same stop 42 from above. Also, while a hexagonal contour of sleeve 43 is believed to be sufficient for all practical purposes, a sleeve with ten or more facets and a corresponding bore in the rollers may be provided in order to simplify the work of the operator desiring to connect one of the rollers to its shaft without necessitating substantial rotation of the roller or sleeve.

Figs. 7 and 8 illustrate a slightly different embodiment of a multiple window in accordance with the present invention, only the lower half thereof being shown for the sake of simplicity. Of course, the window shown in Fig. 7 may also represent an entity when the frame 10 is without a cross member 15 and the height of the window is not impractically great. While the structure of elements of the window frame and the novel window may remain unchanged, the pulley drive 21, 22, 23 of Fig. 1 is replaced by a bevel gear arrangement and a crank that rotates shafts 116, 117 in either direction. As shown, shaft 116 carries a bevel gear 47 and shaft 117 a bevel gear 48 at its respective lower extremity. A transverse shaft 49 is also provided with bevel gears 50 (meshing with 47) and 51 (meshing with 48) and a median bevel gear 52 that in turn meshes with the bevel gear 54 at the end of crank 53 that extends through the window sill 19 with its handle 55 to be within easy reach of the user. Suitable brackets 56, 56', 56" are provided to support shafts 116, 117, 49 and the crank 53 in desirable operative position. The entire mechanism below sill 19 may be enclosed by a suitable cover (not shown) and the handle portion 55 of crank 53 may be made removable when not in use. Fig. 7 also illustrates a zipper 56a connecting the transparent portion 124b and the screen portion 124a of band 124 for ease of disconnection and convenient replacement of a worn out or damaged band portion.

Fig. 9 illustrates a ratchet-and-pawl arrangement for rotation of the rollers 226b, 227b. In accordance with this embodiment, shafts 216, 217 are permanently connected with rollers 226b, 227b, each shaft carrying a ratchet 57, 58 at, say, its lower extremity. Pivotable pawls 59, 60 normally engage their respective ratchets and prevent the rotation of either roller-shaft-band assembly. When a change in the visible band portion from, say, transparent to screen, is desired, pawl 59 is pivoted into its position shown in Fig. 9, and roller 227b rotated manually whereby pawl 60 merely rides over the teeth of ratchet 58. When the screen portion 224a has been brought between side members 11, 12, pawl 59 is pivoted back into engagement with ratchet 57 to lock the structure. Obviously, prior to any rotation of either roller, frame 230 is released by actuating turnbuttons 231, and is again brought into its position against the window frame after engagement of pawl 59 with ratchet 57.

Finally, Fig. 10 illustrates a still further embodiment of the roller drive, according to which the shafts 316, 317 are provided with worm wheels 347, 348 at their lower extremities, meshing with worms 350, 351 on a transverse shaft 349 having a median worm wheel 352 which in turn meshes with worm 354 rotatable in both directions by crank 353 insertable into square hole 354a in worm 354. The usual brackets are shown at 356, 356', 356".

As a further modification, the transparent portion 24b of the upper band 24 may be replaced by a flexible panel which is translucent in its upper half and transparent in its lower half (see band portions 24b' and 24b, respectively, in Fig. 1). This is of advantage on sunny days to prevent direct sun rays from entry into the room, but to still provide sufficient light to obviate the use of artificial light in the daytime. This construction replaces venetian blinds and renders the novel window even more economical.

The screen portion 24a or 25a of respective bands 24, 25 may be made of heavier material with sufficient strength to prevent any accident in multi-story apartment houses. Also, the retaining frames may be provided with suitable cross braces 30' (see Fig. 1) to subdivide the area within the window frame 10 into a plurality of smaller units, whereby the danger that small children may fall from the window of an apartment is eliminated.

Obviously, instead of only three band sections, four or more may be joined in a band, for example, by adding an entire translucent portion or two, or several translucent sections of different color shades. However, in practice, a band consisting of three sections is considered satisfactory, especially since in case of an undue multiplication of band sections, the rollers would require a substantial space at both lateral sides of the window frame which is usually unavailable.

I claim:
1. In a window frame having two lateral sides, in combination: a multipanel window comprising two vertical shafts each rotatably mounted at one lateral side of said frame, each shaft having a lower end and at least one multi-facet portion; at least one pair of horizontally aligned upright rollers, each roller having an end and each pair of rollers being axially traversed by said shafts; a flexible band for each pair of rollers, each band having two lateral sides and consisting of a screen portion, at least one transparent or translucent portion, and a non-transparent portion, the lateral sides of each band being anchored in a pair of said rollers; drive means connected with and located in the proximity of the lower ends of said shafts for rotating same; means for selectively connecting said shafts with said rollers and comprising a sleeve rigidly connected with the end of each roller and surrounding a multi-facet portion of one of said shafts, and retaining means traversing said sleeve and adapted to engage a selected facet of the multi-facet portion of one of said shafts; and a retaining frame for each band, said retaining frame being attached to said window frame for holding the edges of the visible portion of a band against said window frame when said drive means is not actuated and being movable with respect to said window frame into one position in which it sealingly engages a selected band by pressing same against said window frame, and into another position in which it permits horizontal movements of the band when said drive means is actuated and the rollers of a selected band are connected with said shafts.

2. In a window frame having two lateral sides, in combination: a multipanel window comprising two vertical shafts each having a lower end and each rotatably mounted at one lateral side of said frame; at least one pair of horizontally aligned upright rollers axially traversed by said shafts; a flexible band for each pair of rollers, each band having two lateral sides and consisting of a screen portion, at least one transparent or translucent portion, and a non-transparent portion, the lateral sides of each band being anchored in a pair of said rollers; drive means connected with and located in the proximity of the lower ends of said shafts for rotating same, said drive means comprising a pulley fixed to each of said shafts and a belt connecting said pulleys; means for selectively connecting said shafts with said rollers; and a retaining frame for each band, said retaining frame being attached to said window frame for holding the edges of the visible portion of a band against said window frame when said drive means is not actuated and being movable with respect to said window frame into one position in which it sealingly engages a selected band by pressing same against said window frame, and into another position in which it permits horizontal movements of the band when said drive means is actuated and the rollers of a selected band are connected with said shafts.

3. The structure according to claim 2, wherein one of said shafts extends below the pulley which is connected thereto, and said drive means further comprises a first gear rigidly fixed to said one shaft below said last mentioned pulley, a second gear rotatably attached to said window frame and meshing with said first gear, and crank means operatively connected with said second gear for rotating same in two directions whereby to rotate said shafts over said pulleys and said band.

4. In a window frame having a pair of lateral members, an upper transverse member, a lower transverse member, and a cross member between said transverse members, in combination: a multipanel window comprising two vertical shafts each having a lower end and each rotatably attached to one of said lateral members; an upper and a lower pair of horizontally aligned upright rollers, each pair of rollers being axially traversed by said shafts; an upper and a lower flexible band disposed between said upper transverse member and said cross member, and between said cross member and said lower transverse member, respectively, each band having two lateral sides and consisting of a screen portion, at least one transparent or translucent portion, and a non-transparent portion, the lateral sides of the upper and lower band being anchored in the upper and lower pair of said rollers, respectively; drive means connected with and located in the proximity of the lower ends of said shafts for rotating same; means for selectively connecting said rollers with said shafts; an upper and a lower retaining frame pivotally connected with said upper transverse member and said lower transverse member, respectively, for holding the edges of the visible portions of said upper and said lower band against said window frame when said drive means is not actuated, each retaining frame being pivotable with respect to said window frame into one position in which it sealingly engages the respective band by pressing same against said window frame, and into another position in which it permits horizontal movements of the respective band when said drive means is actuated and the respective pair of rollers is connected with said shaft; and means for releasably connecting said upper and said lower retaining frames to said cross member.

5. The structure as set forth in claim 4, further comprising stop means attached to said cross member for limiting the pivoting movements of said lower retaining frame with respect to said window frame.

References Cited in the file of this patent
UNITED STATES PATENTS

| Number | Name | Date |
|---|---|---|
| 119,479 | Smith | Oct. 3, 1871 |
| 463,675 | Arnold | Nov. 24, 1891 |
| 621,595 | Beal | Mar. 21, 1899 |
| 636,787 | Frankl | Nov. 4, 1899 |
| 642,423 | Brodie | Jan. 30, 1900 |
| 762,982 | Brown | June 21, 1904 |
| 831,745 | Rice | Sept. 25, 1906 |
| 986,268 | Colima et al. | Mar. 7, 1911 |
| 986,310 | Phillips | Mar. 7, 1911 |
| 1,015,259 | Beale et al. | Jan. 16, 1912 |
| 1,017,515 | Daus | Feb. 13, 1912 |
| 1,499,016 | Guyton | June 24, 1924 |
| 1,813,980 | Williams | July 14, 1931 |
| 2,057,815 | Boehm | Oct. 20, 1936 |
| 2,271,099 | Schur | Jan. 27, 1942 |
| 2,474,747 | Madriquera | June 28, 1949 |
| 2,564,770 | Spencer | Aug. 21, 1951 |
| 2,585,042 | Sammons | Feb. 12, 1952 |
| 2,585,769 | Hamlin | Feb. 12, 1952 |